United States Patent
Kim

(10) Patent No.: US 8,009,898 B2
(45) Date of Patent: Aug. 30, 2011

(54) APPARATUS AND METHOD FOR ALIGNING IMAGES OBTAINED BY STEREO CAMERA APPARATUS

(75) Inventor: Kwang-Jun Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1144 days.

(21) Appl. No.: 11/734,603

(22) Filed: Apr. 12, 2007

(65) Prior Publication Data

US 2008/0123938 A1    May 29, 2008

(30) Foreign Application Priority Data

Nov. 27, 2006 (KR) .................. 10-2006-0117897

(51) Int. Cl.
*G06K 9/00* (2006.01)
(52) U.S. Cl. .............. 382/154; 382/294; 348/135
(58) Field of Classification Search .............. 382/154
See application file for complete search history.

(56) References Cited

U.S. PATENT DOCUMENTS

| | | | | |
|---|---|---|---|---|
| 5,684,498 A * | 11/1997 | Welch et al. | | 345/8 |
| 5,999,225 A * | 12/1999 | Yagasaki et al. | | 348/564 |
| 6,028,672 A * | 2/2000 | Geng | | 356/602 |
| 6,366,691 B1 * | 4/2002 | Sogawa | | 382/154 |
| 6,674,892 B1 * | 1/2004 | Melen | | 382/154 |
| 2003/0128871 A1 * | 7/2003 | Naske et al. | | 382/154 |
| 2003/0156751 A1 * | 8/2003 | Lee et al. | | 382/154 |
| 2004/0005091 A1 * | 1/2004 | Maruya | | 382/154 |

FOREIGN PATENT DOCUMENTS

| | | |
|---|---|---|
| JP | 2003-061116 A | 2/2003 |
| KR | 10-2005-0085099 A | 8/2005 |
| KR | 10-0590025 B1 | 6/2006 |
| KR | 10-2007-0021694 A | 2/2007 |

* cited by examiner

*Primary Examiner* — Hadi Akhavannik
(74) *Attorney, Agent, or Firm* — Jefferson IP Law, LLP

(57) ABSTRACT

An apparatus and a method for aligning images obtained by a stereo camera apparatus are provided. The apparatus receives images from a first camera and a second camera and searches for a pixel block from an image obtained by one of the cameras (a non-reference camera) having the highest consistency ratio with a pixel block in a specific position of the image obtained by the other camera (a reference camera). Then, the apparatus changes a range of the region displayed on a screen among the image obtained by the non-reference camera according to the position of the searched pixel block to generate and output a stereoscopic image using an image having a screen display region focus of the respective cameras where the two cameras are aligned in the horizontal line.

20 Claims, 5 Drawing Sheets

APPARATUS AND METHOD FOR ALIGNING IMAGES OBTAINED BY STEREO CAMERA APPARATUS

PRIORITY

This application claims the benefit under 35 U.S.C. §119 (a) of a Korean patent application filed in the Korean Industrial Property Office on Nov. 27, 2006 and assigned Serial No. 2006-0117897, the entire disclosure of which is hereby incorporated by reference.

BACKGROUND OF THE INVENTION

1. Field of the Invention

The present invention relates to a stereo camera apparatus. More particularly, the present invention relates to an apparatus and a method for aligning images obtained by each camera mounted in a stereo camera apparatus.

2. Description of the Related Art

In general, a stereo camera apparatus is an apparatus that generates a stereoscopic image. A conventional method of generating a stereoscopic image is to obtain two perspectives of the same image, similar to the use of an eyesight difference between a human's two eyes, in other words, the right eye and the left eye, that is, a binocular disparity (hereinafter called binocular disparity). The right eye and the left eye are placed having a predetermined distance between them equivalent to the distance of the glabella so that a left image and a right image directed to the left eye and the right eye, respectively, are different from each other. Therefore, a binocular disparity occurs. Accordingly, in order to get a stereoscopic image similar to an image generated through a human's two eyes, a camera apparatus requires a left camera and a right camera which have a predetermined distance between them like a human's two eyes. Therefore, a stereo camera apparatus includes at least two cameras, in other words, a left camera and a right camera, and generates a stereoscopic image similar to a stereoscopic image generated by a binocular disparity using the left camera and the right camera which obtain perspectives of an image from different positions.

FIGS. 1A and 1B illustrates examples of images obtained by a conventional stereo camera apparatus.

FIG. 1A illustrates an example of an image obtained by a left camera of the conventional stereo camera apparatus, and FIG. 1B illustrates an example of an image obtained by a right camera of the conventional stereo camera apparatus. As shown in FIGS. 1A and 1B, the respective cameras of the stereo camera apparatus are placed a predetermined distance apart from each other so that a slight difference in position and shape of the image is obtained even though the identical object is photographed by both cameras of the stereo camera apparatus.

The above-mentioned binocular disparity does not refer to the difference of an image in the vertical direction. That is, as a left eye and a right eye are oriented differently in the horizontal direction, the binocular disparity is not caused by a difference in the vertical direction but by a difference in the horizontal direction. However, FIGS. 1A and 1B illustrate that differences of the image obtained by the cameras occurs in both the horizontal direction as well as in the vertical direction.

Those differences may occur for several reasons. For example, the stereo camera apparatus may be mishandled, or there may be manufacturing variations. Manufacturing variations may occur because, no matter how detailed the stereo camera is made, a difference in vertical location may occur when the cameras are installed. Therefore, as shown in FIGS. 1A and 1B, in the conventional stereo camera apparatus, disparities of the images in the vertical direction as well as in the horizontal direction occur so that an exact stereoscopic image may not be generated.

A manufacturer may manually readjust the locations of the stereo cameras to be aligned with the obtained images if the number of stereo camera apparatuses produced is small. However, if the stereo camera apparatus is mass-produced, it is very difficult to examine all cameras and readjust the locations of the cameras because of the enormous expense incurred and time spent to make such adjustments.

SUMMARY OF THE INVENTION

Accordingly, the present invention has been made to address the above-mentioned problems and/or disadvantages, and an object of the present invention is to provide an apparatus and a method for horizontally aligning images obtained by each camera mounted in a stereo camera apparatus so that an error caused by a disparity in the vertical direction is eliminated.

Another object of the present invention is to provide an apparatus and a method for reducing the expense and time required for examining the cameras included in the stereo camera apparatus when the stereo camera apparatus is mass-produced.

In accordance with an aspect of the present invention, an apparatus for aligning images obtained by each camera mounted in a stereo camera apparatus is provided. The apparatus includes a camera unit including a plurality of cameras, and a memory unit for storing a plurality of images obtained by the respective cameras and information on screen display regions of respective images. A reference position search unit determines a specific position among the screen display regions of images obtained by a reference camera among the cameras as a first reference position, selects a predetermined number of pixel blocks from the first reference position, searches for a position of a pixel block which has the highest consistency ratio with the pixel block according the first reference position among the predetermined search region of the image obtained by a non-reference camera, and determines a second reference position from the searched pixel block. The apparatus further includes an offset value determiner for calculating a compensation value of a distance difference in an absolute coordinate, a controller for moving the screen display region of the image obtained by the non-reference camera as much as the compensation value according to the specific direction to set.

In accordance with another aspect of the present invention, a method of aligning images obtained by each camera mounted in stereo camera apparatus is provided. The method includes storing a plurality of images obtained by the respective cameras mounted in the stereo camera apparatus, setting a screen display region of the obtained images and setting a search region in the image obtained by the non-reference camera, setting a first reference position from the screen display region of the reference camera and setting the first reference position selecting a pixel block according to the first reference position, searching for the pixel block which calculates the consistency ratio of the pixel block according to the each pixel block included in the search region and the first reference position and extracts the region of the pixel block having the highest consistency ratio among the pixel blocks included in the search region, determining a second reference position from the extracted pixel block, storing the offset value which represents the distance difference on an absolute coordinate between the first reference distance and the second reference distance in a specific direction, and moving the screen display region of the non-reference camera in a specific direction as much as the offset value.

Other aspects, advantages, and salient features of the invention will become apparent to those skilled in the art from the following detailed description, which, taken in conjunction with the annexed drawings, discloses exemplary embodiments of the present invention.

BRIEF DESCRIPTION OF THE DRAWINGS

The above and other aspects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

To aid in an understanding of certain exemplary embodiments of the present invention, a general overview will be explained as follows. A stereo camera apparatus receives images obtained by a first camera, designated a reference camera, and a second camera, designated a non-reference camera. The camera apparatus searches for a pixel block from the images obtained by the non-reference camera that has the highest consistency ratio with a pixel block in a specific position of an image obtained by the reference camera. Then, the stereo camera apparatus changes a location of the region displayed on a screen from the image obtained by the non-reference camera according to the position of the searched pixel block. The change in location of the display allows the apparatus to generate and output a stereoscopic image using an image having a screen display region focus of the respective cameras where the two cameras are aligned in the vertical direction, in other words, in the same horizontal line. Accordingly, even though an alignment in the vertical direction between cameras of the stereo camera apparatus is dislocated due to an error, occurring perhaps during manufacturing, the stereo camera apparatus realigns the image and generates the stereoscopic image according to the image aligned in the vertical direction so that errors caused by a disparity of an obtained image in the vertical direction when the stereoscopic image is generated are eliminated.

Figure 1A:
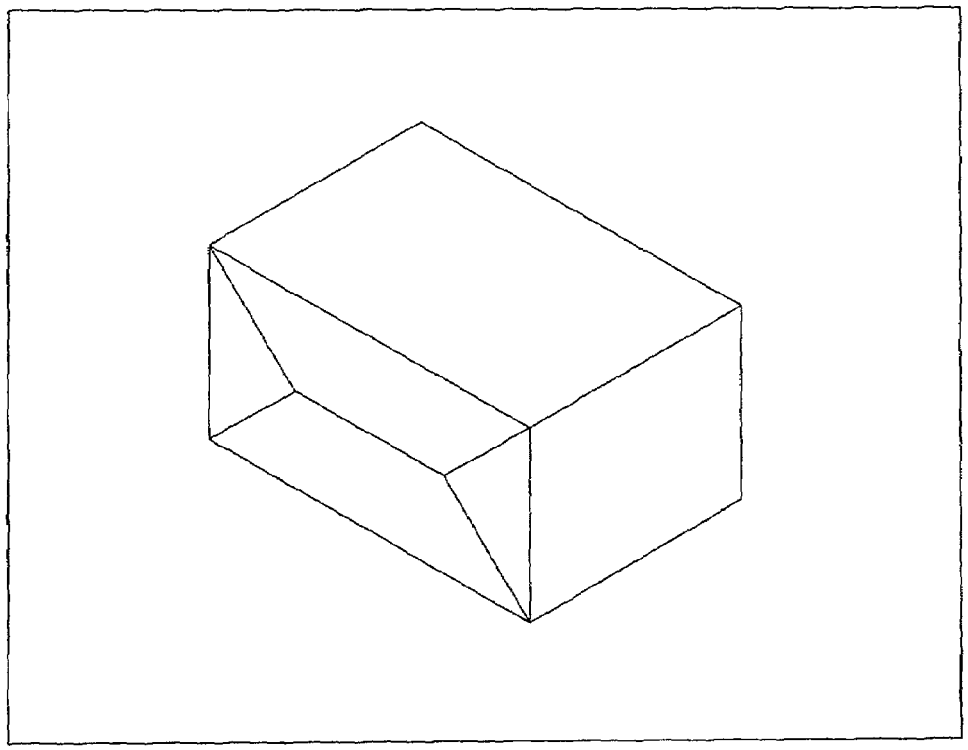
FIGS. 1A and 1B illustrate exemplary images obtained by cameras of a conventional stereo camera apparatus.
Figure 1B:
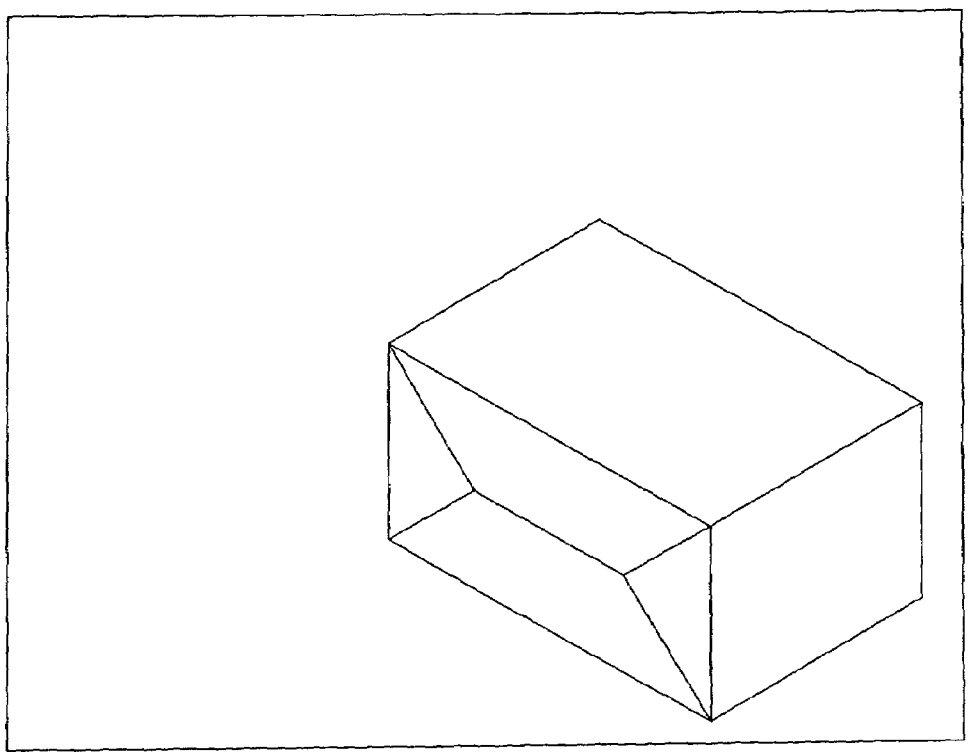
Figure 2:
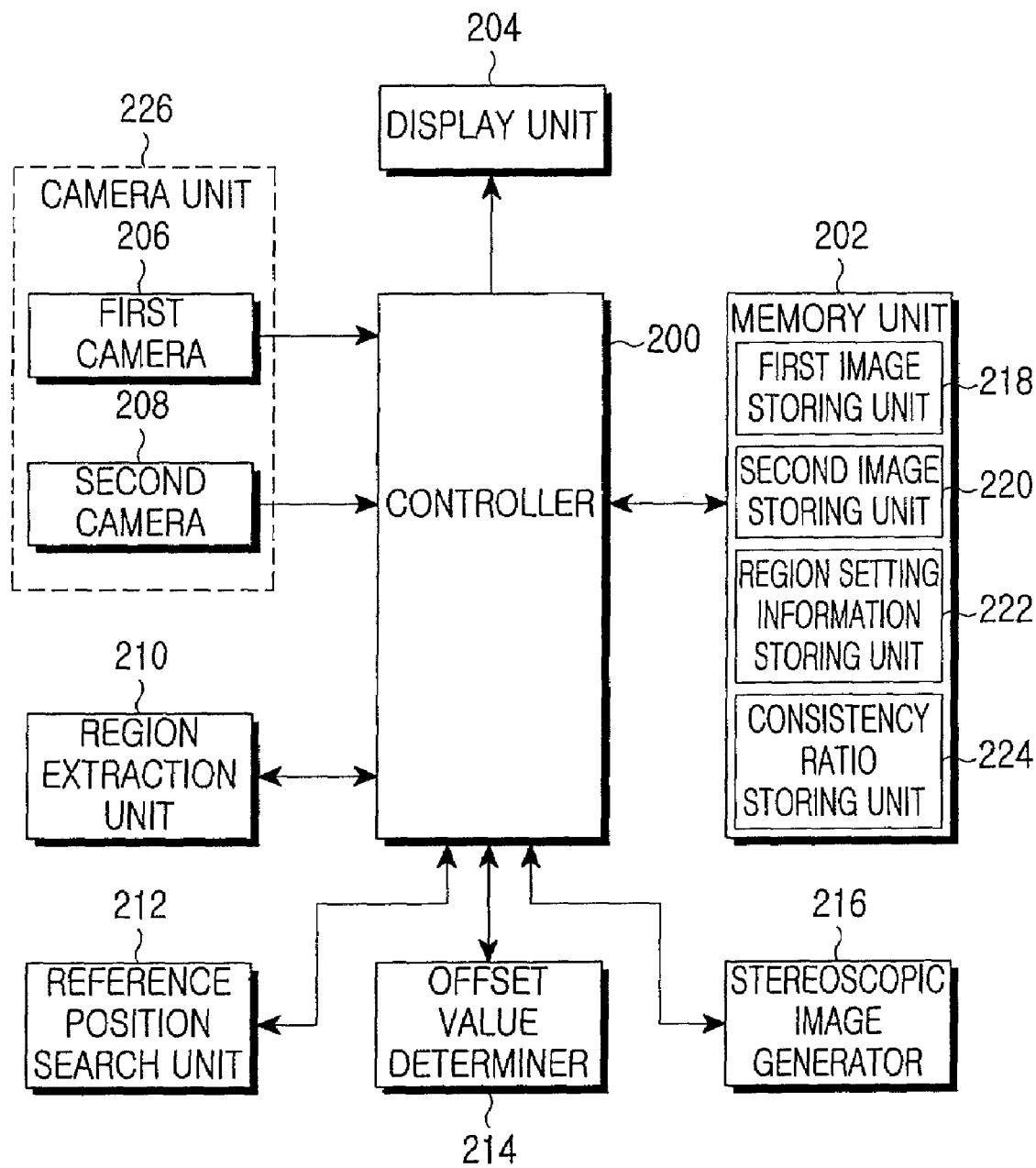
FIG. 2 is a block diagram illustrating a stereo camera aligning apparatus according to an exemplary embodiment of the present invention.

FIG. 2 is a block diagram illustrating a stereo camera apparatus according to an exemplary embodiment of the present invention.

Referring to FIG. 2, the stereo camera apparatus according to an exemplary embodiment of the present invention may include a controller 200, a memory unit 202 connected to the controller 200, a camera unit 226, a display unit 204, a region extraction unit 210, a reference position search unit 212, an offset value determiner 214 and a stereoscopic image generator 216. The controller 200 controls the respective parts of the stereo camera apparatus. For example, the controller controls the stereoscopic image generator 216 to receive an image as a screen display region, which is a selected portion from among the images obtained by the cameras included in the camera unit 226, to generate the image as a stereoscopic image and to output the stereoscopic image.

In an exemplary implementation, the controller 200 selects one camera as a reference camera from among the cameras included in the camera unit 226. The controller controls the reference position search unit 212 to select a specific position of the image obtained by the reference camera, in other words, a pixel block, and sets the selected position as a first reference position. In an exemplary embodiment, the first reference position may include a predetermined area surrounding the center of the obtained image. From the image obtained by the non-reference camera, the controller 200 controls the reference position search unit 212 to calculate the consistency ratio between the pixel block selected as the first reference position and pixel blocks of the non-reference image having approximately the same area as the reference position.

The consistency ratio may be determined based on a comparison of pixel values of each pixel included in the pixel block selected from the image obtained by the reference camera, for example, red, green, blue (RGB) and YCbCr value or the like, with the pixel values of each pixel included in the pixel block selected from the image obtained by the non-reference camera. Accordingly, the higher the consistency ratio is, the more similar the images corresponding to the respective pixel blocks are.

The controller 200 controls the reference position search unit 212 to search for the position of the pixel block having the highest consistency ratio from the image obtained by the non-reference camera. The second reference position is determined from the pixel block of the image obtained by the non-reference camera. The controller 200 controls the offset value determiner 214 to calculate a distance difference in the vertical direction on an absolute coordinate between the first reference position and the second reference position. The controller 200 changes the screen display region of the non-reference camera as much as the compensation value of the distance difference, in other words, the offset value in the vertical direction. Then, the image transmitted from the non-reference camera and the image transmitted from the reference camera are aligned in the vertical direction. In other words, the screen display region is set on a certain point positioned on the same horizontal line, and thus the images transmitted from the reference camera and the non-reference camera are aligned in the vertical direction. Then, the controller 200 inputs the image of the cameras aligned in the vertical direction to the stereoscopic image generator 216 to generate a stereoscopic image. The controller then outputs the generated stereoscopic image through the display unit 204.

In an exemplary implementation, to decrease the time for searching for the second reference position of the image obtained by the non-reference camera, the controller 200 may compare pixel blocks within a predetermined region (hereinafter called a search region) of the screen display region of the image obtained by the non-reference camera with the pixel block selected as the first reference position to calculate the consistency ratio. In an exemplary embodiment, the controller 200 sets a threshold value of a minimum consistency ratio in advance, and may compare the threshold value of the minimum consistency ratio with the consistency ratio that resulted from the comparison between the pixel block included in the search region and the first reference position.

If the value of the highest consistency ratio, from among the values of the consistency ratios calculated between the pixel blocks of the image region corresponding to the search region of the screen display region and the pixel block according to the first reference position, is less than the threshold value, the controller 200 may calculate the consistency ratio between pixel blocks corresponding to an image included in the screen display region excluding the currently set search region by changing the search region and the pixel blocks of the first reference region. In an exemplary embodiment, a change of the search region corresponds to the change in the size of the search region, a change of the location of the search region or the like. It is a matter of course that the new search region may be set independently of the predetermined search region in order to set the region which was not included in the search region before.

The camera unit 226 includes a plurality of cameras to generate a stereoscopic image in a stereo camera apparatus. The generation of a stereoscopic image using an effect similar to the binocular disparity between the human's two eyes is illustrated in an exemplary embodiment of the present invention, and thus the camera unit 226 includes two cameras, in other words, a first camera 206 and a second camera 208. However, in an exemplary implementation of the present invention, the camera unit may include any number of cameras depending on the method of generating a stereoscopic image. In this case, the controller 200 selects the reference camera from among the cameras, and selects another camera among the remaining cameras, and then changes the screen display region of the secondly selected camera. The foregoing operations are repeated on the remaining cameras so that the screen display regions in all cameras can be aligned in the specific direction, for example, in the horizontal direction.

The memory unit 202 connected to the controller 200 may include a read only memory (ROM), a flash memory, and a random access memory (RAM) or the like. The memory unit 202 stores the program and various reference data for processing and controlling the controller 200, and provides the region for storing a working memory of the controller 200 and various renewable data for records.

The memory unit 202 provides a region for storing the image obtained by the first camera 206 and the image obtained by the second camera 208. Hereinafter, the storing region for storing the image obtained by the first camera 206 is called a first image storing unit 218, and the storing region for storing the image obtained by the second camera 208 is called a second image storing unit 220.

The memory unit 202 stores the information of the screen display regions to be displayed on the screen from the images obtained by the cameras 206 and 208 and stores the search region for searching the second reference position from the screen display region of the non-reference camera among the cameras 206 and 208. Further, the memory unit 202 includes a storing region for storing the value of the consistency ratio obtained in the searching process of the second reference position as determined by the reference position search unit 212 according to the control of the controller 200. Hereinafter, the storing region of the memory unit 202 which stores the information of the screen display regions and the search region is called a region setting information storing unit 222, and a storing region for storing the value of the consistency ratio is called a consistency ratio storing unit 224.

In accordance with the control of the controller 200, the region extracting unit 210 extracts the image regions according to the screen display region information as a screen display region from the images obtained by the cameras 206 and 208.

The reference position search unit 212 calculates the consistency ratio of each pixel block from the image obtained by the non-reference camera with the pixel block of the first reference position selected from the image obtained by the reference camera according to the control of the controller 200, and searches for the second reference position corresponding to the first reference position in the image obtained by the non-reference camera.

The offset value determiner 214 calculates the distance difference in the specific direction of the first reference position and the second reference position, for example, the distance difference on an absolute coordinate in the vertical direction. The compensation value of the distance difference on an absolute coordinate is stored as the offset value.

The stereoscopic image generator 216 generates a stereoscopic image using the image of the screen display region transmitted from the image obtained by the reference camera and the image of the changed screen display region transmitted from the image obtained by the non-reference camera according to the control of the controller 200. Then, the stereoscopic image is transmitted to the controller 200 and is transmitted through the display unit 204 according to the control of the controller 200.

Figure 3:
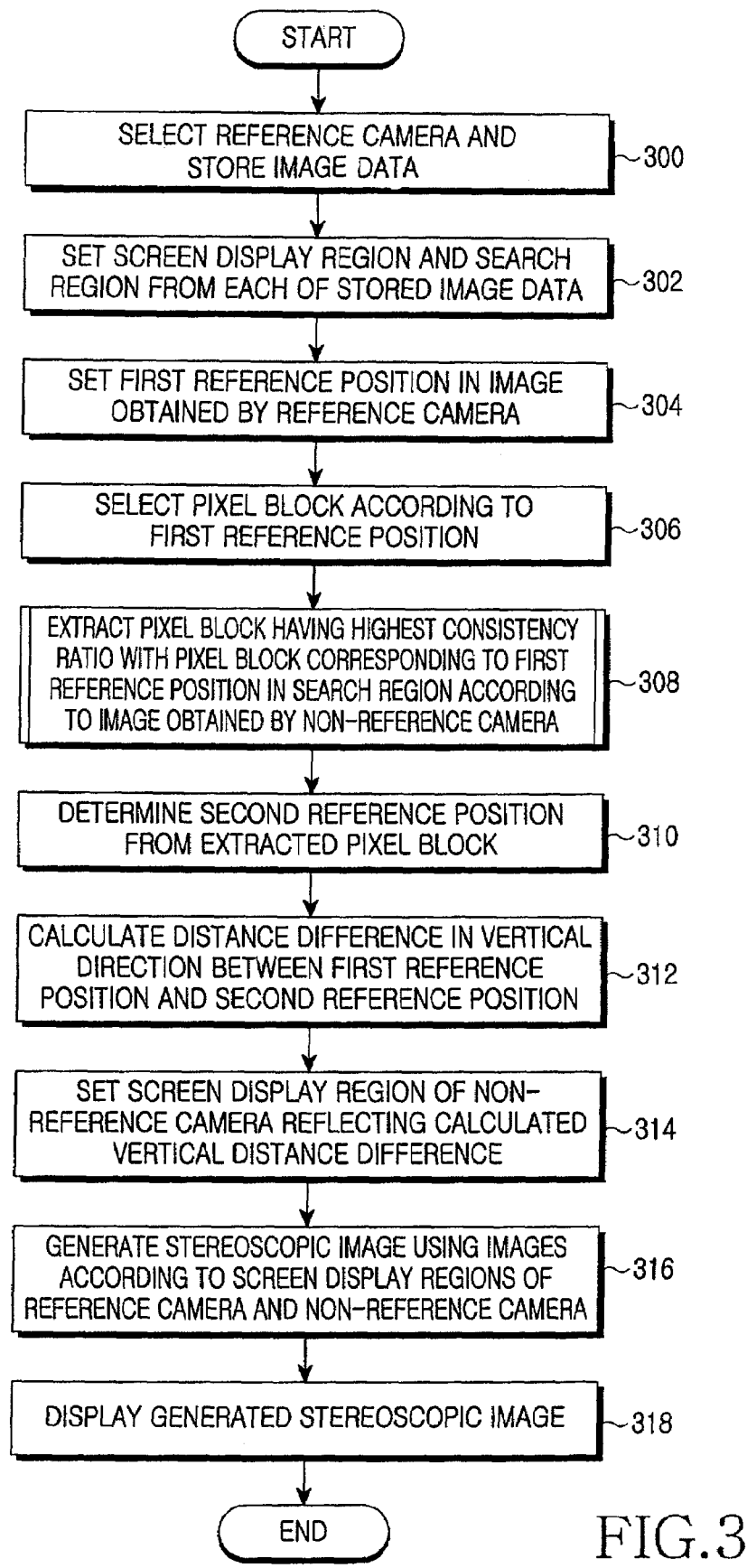
FIG. 3 is a flowchart illustrating an operation for aligning a stereo camera of a stereo camera aligning apparatus according to an exemplary embodiment of the present invention.
Figure 4:
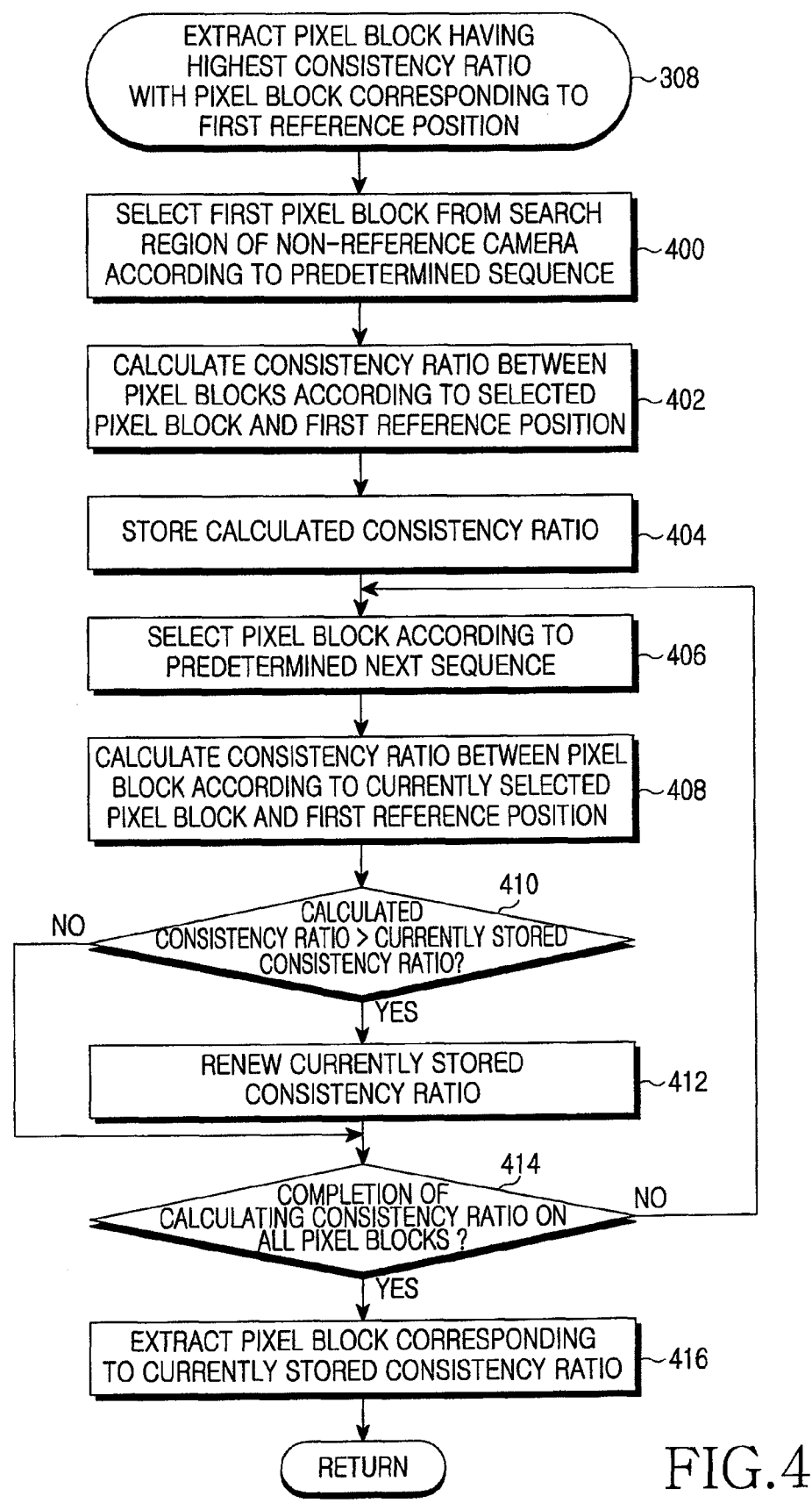
FIG. 4 is a flowchart illustrating an operation for extracting a pixel block having an optimum consistency ratio from the obtained images in a stereo camera aligning apparatus according to an exemplary embodiment of the present invention.

FIG. 3 is a flowchart illustrating an operation for aligning the stereo camera of a stereo camera aligning apparatus according to an exemplary embodiment of the present invention. FIG. 4 is a flowchart illustrating, in greater detail, an operation for extracting the pixel block having the optimum consistency ratio from the obtained images in a stereo camera aligning apparatus according to an exemplary embodiment of the present invention.

Referring to FIG. 3, the stereo camera apparatus according to an exemplary embodiment of the present invention proceeds to step 300 to select a camera which is to be the reference camera from among the cameras 206 and 208 in step 300. In an exemplary embodiment, selection of the reference camera may be set as a default and may be changed in accordance with a user's choice. Hereinafter and merely as an example, the first camera 206 will be described as the camera set to be the reference camera. Also, the stereo camera apparatus stores the image data obtained by the first camera 206 and the second camera 208.

The stereo camera apparatus according to an exemplary embodiment of the present invention proceeds to step 302 to set the screen display region from each of the stored image data according to the screen display region setting information stored on the memory unit 202. Also in step 302, to set the screen display region from each of the stored images, the exemplary apparatus loads the information on the search region for searching the second reference position corresponding to the first reference position. Furthermore, the stereo camera apparatus determines the second reference position search region according to the information on the search region from the image obtained by the non-reference camera, in other words, the second camera 208.

The stereo camera apparatus according to an exemplary embodiment of the present invention proceeds to step 304 to set a specific position, for example, the center of the currently set screen display region among the image region obtained by the reference camera, as the first reference position. The stereo camera apparatus proceeds to step 306 to select the predetermined number of pixel blocks based on the currently set first reference position.

The stereo camera apparatus according to an exemplary embodiment of the present invention proceeds to step 308 to select pixel blocks having the same size as the pixel block set as the first reference position, from the currently set search region of the image obtained by the non-reference camera, in other words, the second camera 208, in a predetermined sequence.

The stereo camera apparatus according to an exemplary embodiment of the present invention calculates the consistency ratio between each of the pixel blocks selected from the search region and the pixel block according to the first reference position. Here, the calculated consistency ratio may be stored in a consistency ratio storing unit 224 of the memory unit 202. The stereo camera apparatus according to an exemplary embodiment of the present invention extracts the pixel block that has the highest consistency ratio with the pixel block according to the first reference position, from among the pixel blocks selected in the image region included in the search region using the stored consistency ratio.

FIG. 4 illustrates the operation of step 308 in FIG. 3 in greater detail. Referring to FIG. 4, when selection of the pixel blocks according to the first reference position in step 306 of FIG. 3 is completed, the stereo camera apparatus according to an exemplary embodiment of the present invention proceeds to step 400 to select the first pixel block from the search region currently set in the non-reference camera, in other words, the second camera 208, in the predetermined sequence. In an exemplary embodiment, the predetermined sequence may set the sequence from upper right to lower left, however, the present invention is not limited to any specific sequence.

The stereo camera apparatus according to an exemplary embodiment of the present invention proceeds to step 402 to calculate the consistency ratio between the pixel block selected in step 400 and the pixel block selected according to the first reference position. In an exemplary embodiment, the consistency ratio may be calculated based on whether the pixels included in the pixel block selected from the search region have the same value as the pixels included in the pixel block according to the first reference position and how many such pixels exist. For example, the consistency ratio may be calculated as the number of the pixels or the like which are consistent with the RGB value or YCbCr value of the pixels included in each of the pixel blocks.

If the consistency ratio corresponding to the pixel block selected in the first place is calculated, the stereo camera apparatus according to an exemplary embodiment of the present invention proceeds to step 404 to store the consistency ratio. The stereo camera apparatus proceeds to step 406 to select the next pixel block from the search region obtained by the non-reference camera according to the predetermined sequence, and proceeds to step 408 to calculate again the consistency ratio between the currently selected pixel block and the pixel block according to the first reference position.

The stereo camera apparatus according to an exemplary embodiment of the present invention proceeds to step 410 to compare the currently calculated consistency ratio with the stored consistency ratio, and determine whether the currently calculated consistency ratio exceeds the stored consistency ratio. If the currently calculated consistency ratio does not exceed the stored consistency ratio as the result of the determination of step 410, the stereo camera apparatus according to an exemplary embodiment of the present invention proceeds to step 414 to determine whether the calculation of the consistency ratio of all pixel blocks corresponding to the current search region is completed. If the consistency ratio of all pixel blocks is not calculated as the result of determination of step 414, the stereo camera apparatus according to an exemplary embodiment of the present invention returns to step 406 to select the pixel block in the predetermined next sequence. The process from step 406 to step 414 is performed repeatedly.

If the currently calculated consistency ratio exceeds the stored consistency ratio as the result of determination of step 410, the stereo camera apparatus according to an exemplary embodiment of the present invention proceeds to step 412 to renew or update the currently stored consistency ratio into the currently calculated consistency ratio. The stereo camera apparatus proceeds to step 414 to determine whether the calculation of the consistency ratio of all pixel blocks corresponding to the current search region is completed.

If the calculation of the consistency ratio between the respective pixel block of the image region corresponding to the currently set search region and the pixel block according to the first reference position is completed as the result of the determination of step 414, the stereo camera apparatus according to an exemplary embodiment of the present invention proceeds to step 416 to extract the position of the pixel block corresponding to the currently stored consistency ratio. However, when the consistency ratio of all pixel blocks is not calculated as the result of determination of step 414, the stereo camera apparatus according to an exemplary embodiment of the present invention returns to step 406 to select the pixel block in the image region corresponding to the search unit in the predetermined next sequence and the process from step 406 to step 414 is performed repeatedly.

Though the threshold value of the predetermined consistency ratio in FIG. 4 is not mentioned, it is a matter of course that a process of comparing the threshold value of the predetermined consistency ratio with the value of the currently stored conformation ratio can be further included after step 414 in FIG. 4. In an exemplary implementation, if the currently stored consistency ratio is not more than the threshold value of the consistency ratio, a process of changing the currently set search region can be further included. If the search region is changed like this, it is a matter of course that the process from step 400 to step 414 and the process of comparing the stored consistency ratio with the threshold value of the consistency ratio are performed repeatedly.

Alternatively, if the pixel block of the specific position from the currently set search region in step 308 is extracted through the process in FIG. 4, the stereo camera apparatus according to an exemplary embodiment of the present invention proceeds to step 310 to determine the second reference position from the extracted pixel block. Here, the second reference position may be a position corresponding to the center of the pixel block extracted in step 308. The determination of the second reference position corresponds to the method of setting the pixel block from the first reference position. For example, if center of the pixel block according to the first reference position is a method of setting based on the first reference position, the second reference position may be set on the center of the pixel block extracted in current step 308.

If the second reference position is determined, the stereo camera apparatus proceeds to step 312 to control the offset value determiner 214 and calculate the distance difference in the vertical direction on the absolute coordinate between the first reference position and the second reference position based on the currently determined first reference position. The stereo camera apparatus according to an exemplary embodiment of the present invention proceeds to step 314 to change the screen display region of the non-reference camera in the vertical direction as much as the compensation value of the extracted vertical distance difference, in other words, in the direction of compensating the extracted vertical distance difference. For example, if the extracted vertical distance difference corresponds to −100 pixels, the screen display region of the non-reference camera is moved in the vertical direction as much as the distance corresponding to the 100 pixels, which is the compensation value corresponding to the −100 pixels. The screen display region information stored before is renewed as the information on the screen set region of the non-reference camera.

The stereo camera apparatus according to an exemplary embodiment of the present invention proceeds to step 316 to extract the image region corresponding to the screen display region currently set in both the reference camera and the non-reference camera and then generate the stereoscopic image. The stereo camera apparatus proceeds to step 318 to transmit the currently generated stereoscopic image through the display unit 204. Accordingly, even though the respective cameras are not aligned in the vertical direction, the stereo camera apparatus according to an exemplary embodiment of the present invention compensates for the vertical distance difference between two cameras, and a normal stereoscopic image is generated.

Figure 5A:
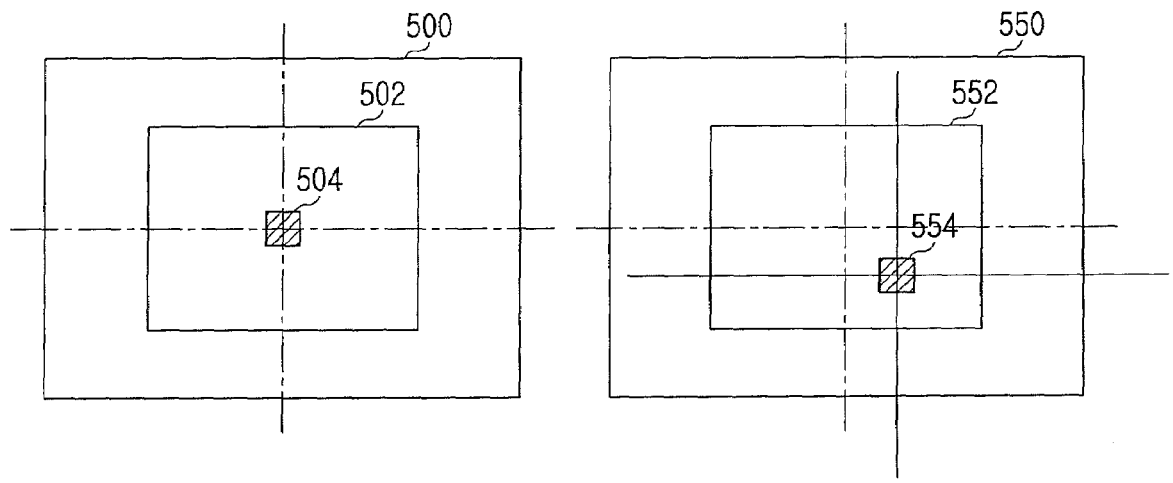
FIGS. 5A and 5B are diagrams illustrating examples of the stereo camera aligning apparatus for aligning the stereo camera according to an exemplary embodiment of the present invention.
Figure 5B:
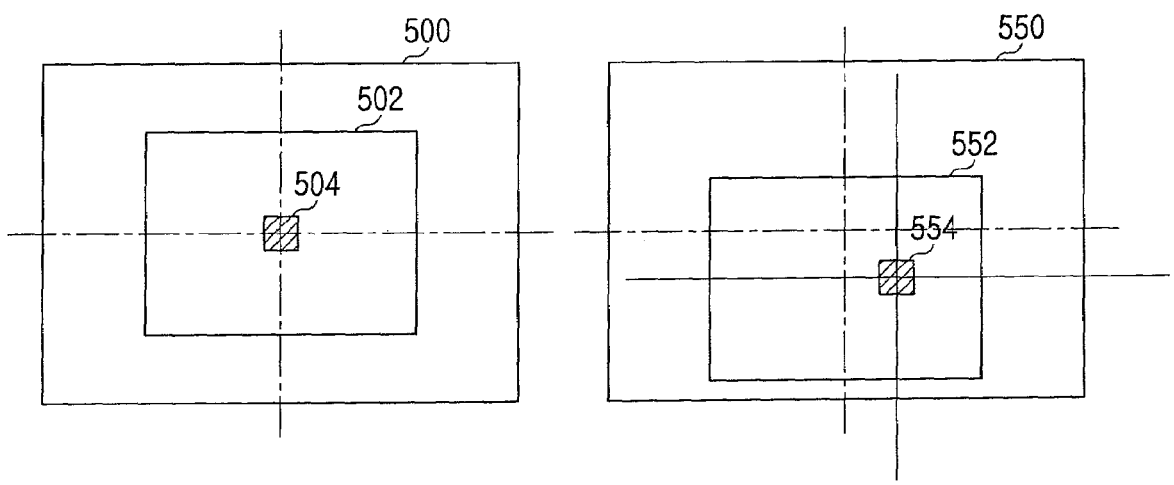

FIGS. 5A and 5B are diagrams illustrating examples of the stereo camera aligning apparatus for aligning a stereo camera according to an exemplary embodiment of the present invention.

FIG. 5A illustrates the images 500 and 550 obtained by each of the first camera 206 and the second camera 208 of which the realignment is not performed and the respective screen display regions 502 and 552 set in the obtained image in the stereo camera apparatus according to an exemplary embodiment of the present invention.

In an exemplary implementation, the stereo camera apparatus according to an exemplary embodiment of the present invention determines the first reference position from the screen display region 502 of the image 500 obtained by the first camera 206, in other words, the reference camera and selects the pixel block 504 correspondingly. Through the process of FIG. 4, in the predetermined search region of the image 550 obtained by the second camera 208, the position of the pixel block 554 having the highest consistency ratio with the pixel block 504 corresponding to the first reference position is searched. Here, the predetermined search region will be described on the assumption that it is same as the screen display region 552 of the second camera 208. If the position of the pixel block 554 having the highest consistency ratio is searched, the second reference position from the searched position is determined.

As shown in the process of FIG. 3, in the stereo camera apparatus according to an exemplary embodiment of the present invention, the compensation value corresponding to the vertical distance difference between the first reference position and the second reference position is calculated as the offset value. The screen display region of the second camera 208 is vertically moved toward the direction of compensating the vertical distance difference as much as the offset value.

FIG. 5B illustrates an example of the result that the screen display region of the non-reference camera, in other words, the second camera 208, is changed. As shown in FIG. 5B, the screen display region of the second camera is set to move vertically as much as the vertical distance difference between the first reference position and the second reference position, so that the actual image region transmitted from the first camera 206 and the second camera 208 has the focus on the same horizontal line. Accordingly, even though the locations of the cameras are not aligned in the vertical direction, the stereo camera apparatus according to the present invention itself realigns the focuses of the two cameras in the vertical direction so that the images aligned vertically is displayed, thereby allowing a normal stereoscopic image to be generated.

Accordingly, an exemplary stereo camera apparatus of the present invention aligns the images obtained by the cameras included in the stereo camera apparatus in the horizontal direction to minimize or eliminate an error caused by a disparity in the vertical direction. This reduces the expense and time required for examining the cameras included in the stereo camera when the stereo camera is mass-produced. Furthermore, when the vertical alignment of the obtained images is misaligned due to use over time, the present invention easily realigns the misaligned image.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A stereo camera apparatus comprising:
   a camera unit comprising a plurality of cameras;
   a memory unit for storing a plurality of images obtained by respective cameras of the plurality of cameras and information regarding screen display regions of respective images of the plurality of images;
   a reference position search unit for determining a specific position among screen display regions of images obtained by a reference camera among the cameras as a first reference position, for selecting a number of pixel blocks from the first reference position, for searching for a position of a pixel block which has a highest consistency ratio with the pixel block according to the first reference position among a predetermined search region of an image obtained by a non-reference camera, and for determining a second reference position from the searched pixel block;

an offset value determiner for calculating a distance compensation value; and a controller for moving the screen display region of the image obtained by the non-reference camera as much as the compensation value, so that the screen display regions of the images obtained by the reference camera and the non-reference camera have focuses on a same horizontal line, wherein the distance compensation value is calculated with regard to a direction perpendicular to the horizontal line.

2. The apparatus as claimed in claim 1, wherein the consistency ratio comprises a number of pixels in the pixel block of the first reference position having an identical pixel value to the pixels in the pixel blocks of the search region.

3. The apparatus as claimed in claim 2, wherein the pixel value comprises at least one of a red, green, blue (RGB) value and an YCbCr value.

4. The apparatus as claimed in claim 1, wherein the screen display region is moved in at least one of a vertical direction and a horizontal direction.

5. The apparatus as claimed in claim 1, wherein the controller controls the reference position search unit to search for the second reference position by changing the search region when the consistency ratio corresponding to the pixel block for determining the second reference position is less than a threshold value of the consistency ratio.

6. The apparatus as claimed in claim 1, further comprising a stereoscopic image generator for generating a stereoscopic image using image regions corresponding to the moved screen display region among the image regions obtained by the reference camera and the non-reference camera.

7. A method of aligning images in a stereo camera apparatus, the method comprising:

storing a plurality of images obtained by each of a plurality of cameras mounted in the stereo camera apparatus;

setting screen display regions for the obtained images;

setting a search region in an image obtained by a non-reference camera from among the plurality of cameras;

setting a first reference position from a screen display region of a reference camera and selecting a pixel block according to the first reference position;

searching a plurality of pixel blocks of the search region for one of the plurality of pixel blocks having a highest consistency ratio with the pixel block of the first reference position and extracting a region of the pixel block having the highest consistency ratio;

determining a second reference position corresponding to the extracted region of the pixel block;

storing an offset value corresponding to a distance difference between the first reference position and the second reference position in a specific direction; and moving the screen display region of the non-reference camera in a direction corresponding to the offset value, so that the screen display regions of the reference camera and the non-reference camera have focuses on a same horizontal line, wherein the specific direction is perpendicular to the horizontal line.

8. The method as claimed in claim 7, wherein the setting of the first reference position comprises:

determining a central position of the screen display region of the reference camera as the first reference position; and selecting a pixel block which selects a predetermined number of the pixels as the pixel block according to the first reference position based on the position in which the first reference position is set in the image obtained by the reference camera, when the first reference position is completed to set.

9. The method as claimed in claim 8, wherein, in the determining step of the second reference position, a position corresponding to a center of the extracted pixel blocks is determined as the second reference position.

10. The method as claimed in claim 7, wherein the consistency ratio comprises a number of the pixels having the same pixel value among the pixels included in the pixel block selected as a measure object for the consistency ratio from the pixel block according to the first reference position and the pixel blocks of the search region.

11. The method as claimed in claim 10, wherein the pixel value comprises at least one of a red, green, blue (RGB) value and an YCbCr value.

12. The method as claimed in claim 7, wherein the specific direction comprises at least one of a vertical direction and a horizontal direction.

13. The method as claimed in claim 7, wherein the searching comprises:

comparing a threshold value of a predetermined consistency ratio with a consistency ratio corresponding to the pixel block in order to determine the second reference position;

changing the search region when the consistency ratio corresponding to the pixel block for determining the second reference position is less than the threshold value of the consistency ratio, as a result of the comparison of the threshold value of the consistency ratio; and re-searching the second reference position which searches the position of the pixel block for determining again the second reference position in the changed search region.

14. The method as claimed in claim 7, further comprising generating a stereoscopic image using image regions corresponding to the screen display region of the reference camera and the changed screen display region of the non-reference camera.

15. A stereo camera apparatus comprising:

a plurality of cameras comprising a reference camera and at least one non-reference camera;

means for storing a plurality of images obtained by the plurality of the cameras;

means for setting a screen display region for each of the obtained images;

means for setting a search region in an image obtained by the at least one non-reference camera;

means for setting a first reference position from the screen display region of the reference camera and for selecting a reference pixel block corresponding to the first reference position;

means for determining which pixel block in the search region is most consistent with the reference pixel block;

means for determining a second reference position for the pixel block having the highest consistency ratio;

means for storing an offset value which corresponds to a distance difference between the first reference position and the second reference position; and means for adjusting the screen display region of the at least one non-reference camera in accordance with the offset value, so that the screen display regions of the reference camera and the at least one non-reference camera have focuses on a same horizontal line, wherein the offset value is calculated with regard to a direction perpendicular to the horizontal line.

16. A stereo camera apparatus comprising:

a camera unit comprising at least a first camera and a second camera;

a reference position search unit for determining a first reference position from first image data obtained by the first camera, for setting and evaluating a first pixel block corresponding to the first reference position, for searching and evaluating second image data obtained from the second camera to determine a second pixel block having a highest consistency ratio with the first pixel block, and for determining a second reference position corresponding to the second pixel block;

an offset value determiner for calculating a compensation value corresponding to differences between the first and second reference positions; and a controller for adjusting a screen display region of the second image data in correspondence with the compensation value, so that a screen display region of the first image data and the screen display region of the second image data have focuses on a same horizontal line, wherein the compensation value is calculated with regard to a direction perpendicular to the horizontal line.

17. The apparatus as claimed in claim 16, wherein the first and second pixel blocks comprise a first and second group of pixels respectively, and wherein the consistency ratio comprises a number of pixels in the second group having a substantially identical pixel value to the pixels in the first group.

18. The apparatus as claimed in claim 17, wherein the pixel value comprises at least one of a red, green, blue (RGB) value and an YCbCr value.

19. A method of aligning images in a stereo camera apparatus, the method comprising:

storing a first image obtained by a first camera;

storing a second image obtained by a second camera;

setting a search region in the second image;

determining a first reference position from the first image and selecting a first pixel block according to the first reference position;

searching a plurality of pixels blocks of the second image for one of the plurality of pixel blocks having the highest consistency ratio with the first pixel block;

determining a second reference position corresponding to the pixel block having the highest consistency ratio with the first pixel block;

determining an offset value corresponding to a difference between the first reference position and the second reference position; and moving a display region of the second image in a direction corresponding to the offset value, so that a display region of the first image and the display region of the second image have a focus on a same horizontal line, wherein the offset value is calculated with regard to the direction, the direction being perpendicular to the horizontal line.

20. The method as claimed in claim 19, wherein the searching comprises:

sequentially searching each of the plurality of pixel blocks of the second image;

determining a first pixel value of each of a first plurality of pixels in the first pixel block;

determining a second pixel value of each of a second plurality of pixels in the pixel block of the second image being currently searched;

comparing the first pixel values with the second pixels values;

determining a number of first and second pixel values that are substantially identical;

determining one of the plurality of the pixels blocks of the second image having the greatest number of substantially identical pixel values as the pixel block of the second image having the highest consistency ratio.

* * * * *